US008921739B2

(12) United States Patent
Petrenko et al.

(10) Patent No.: US 8,921,739 B2
(45) Date of Patent: Dec. 30, 2014

(54) SYSTEMS AND METHODS FOR WINDSHIELD DEICING

(75) Inventors: Victor Petrenko, Lebanon, NH (US); Charles R. Sullivan, West Lebannon, NH (US); Oleg Nickolayev, Redwood, CA (US); Valeri Kozlyuk, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 216 days.

(21) Appl. No.: 13/253,753

(22) Filed: Oct. 5, 2011

(65) Prior Publication Data

US 2012/0234816 A1 Sep. 20, 2012

Related U.S. Application Data

(60) Continuation-in-part of application No. 11/933,160, filed on Oct. 31, 2007, now abandoned, which is a continuation-in-part of application No. 11/409,914, filed on Apr. 24, 2006, now Pat. No. 7,629,558, which is a continuation of application No. 10/939,289, filed on Sep. 9, 2004, now Pat. No. 7,034,257, which is a division of application No. 10/364,438, filed on Feb. 11, 2003, now Pat. No. 6,870,139.

(60) Provisional application No. 60/893,042, filed on Mar. 5, 2007, provisional application No. 60/356,476, filed on Feb. 11, 2002, provisional application No. 60/398,004, filed on Jul. 23, 2002, provisional application No. 60/404,872, filed on Aug. 21, 2002.

(51) Int. Cl.
*B60L 1/02* (2006.01)
*H05B 3/02* (2006.01)
*H05B 1/02* (2006.01)
*H05B 3/84* (2006.01)

(52) U.S. Cl.
CPC ................ *H05B 3/84* (2013.01); *H05B 1/0236* (2013.01); *H05B 2203/035* (2013.01)
USPC ........... 219/203; 219/488; 219/490; 219/491; 219/492

(58) Field of Classification Search
USPC .......... 219/203, 488, 490–492, 522; 296/84.1
See application file for complete search history.

(56) References Cited

U.S. PATENT DOCUMENTS 4,114,082 A * 9/1978 Scheidler ...................... 320/117
4,814,931 A * 3/1989 Kugelman et al. .............. 361/56

(Continued)

FOREIGN PATENT DOCUMENTS

GB 2261333 A * 5/1993 ................ B60S 1/02
JP 58170615 A * 10/1983 ............... B60H 3/00

*Primary Examiner* — Tu B Hoang
*Assistant Examiner* — Michael Hoang
(74) *Attorney, Agent, or Firm* — Lathrop & Gage LLP

(57) ABSTRACT

Cost efficient, lightweight and rapid windshield deicing systems and methods are disclosed. The systems utilize step-up converters or inverters, or dual-voltage batteries, to provide a voltage high enough to deice a windshield in less than thirty seconds at ambient temperatures above −10 C. Some of the disclosed systems include sensors for deicing element and ambient temperatures, and in some embodiments windspeed. All embodiments have a controller for limiting deicing time to that sufficient to melt a boundary layer of ice. The controller of embodiments with sensors computes deicing time as a function of ambient temperature. Embodiments interact with wiper systems to enable wipers to clear ice once the boundary layer is melted.

2 Claims, 12 Drawing Sheets

(56) References Cited

U.S. PATENT DOCUMENTS

| | | | | |
|---|---|---|---|---|
| 5,886,321 | A * | 3/1999 | Pinchok et al. | 219/203 |
| 6,660,968 | B1 * | 12/2003 | Mottelet et al. | 219/203 |
| 2005/0274398 | A1 * | 12/2005 | Fonville et al. | 134/34 |
| 2007/0176049 | A1 * | 8/2007 | Greene | 244/134 F |

* cited by examiner

SYSTEMS AND METHODS FOR WINDSHIELD DEICING

RELATED APPLICATIONS

The present application in a continuation-in-part to U.S. patent application Ser. No. 11/933,160, filed Oct. 31, 2007, which claims benefit of priority to co-owned U.S. Provisional Patent Application No. 60/893,042, filed Mar. 5, 2007. U.S. patent application Ser. No. 11/933,160, filed Oct. 31, 2007, was also a continuation-in-part of U.S. patent application Ser. No. 11/409,914, filed Apr. 24, 2006, now U.S. Pat. No. 7,629, 558, which is a continuation of U.S. patent application Ser. No. 10/939,289, filed Sep. 9, 2004, now U.S. Pat. No. 7,034, 257, which is a divisional application of U.S. patent application Ser. No. 10/364,438, filed Feb. 11, 2003 now U.S. Pat. No. 6,870,139, which claims the benefit of U.S. provisional application Ser. No. 60/356,476, filed Feb. 11, 2002; U.S. provisional application Ser. No. 60/398,004, filed Jul. 23, 2002 and U.S. provisional application Ser. No. 60/404,872, filed Aug. 21, 2002. All of the above-referenced applications are incorporated herein by reference.

RELATED COPENDING APPLICATIONS

The present application is also related to copending, co-owned, patent application Ser. No. 11/338,239, filed Jan. 24, 2006; PCT/US06/002283, filed Jan. 24, 2006; PCT/US07/069,478, filed May 22, 2007, and Ser. No. 11/571,231, filed Dec. 22, 2006.

FIELD

The present application relates to the field of electrothermal deicing and anticing systems for windshields.

BACKGROUND

Transparent windshields for various vehicles, such as cars, rail vehicles including trains, streetcars, and locomotives, snowmobiles, airplanes, helicopters and sea vessels, must be deiced or defrosted using available on-board power. Typically, deicing and defrosting are accomplished by blowing air heated by the vehicle's engine onto the windshield. However, especially since the engine is initially cold upon startup, deicing/defrosting takes a considerable amount of time.

To deice a windshield in less than thirty seconds, a high voltage (typically over 100V) and high power (typically greater than 3 kW) must be applied to an electrically heated windshield. Common 12V DC power sources, found in most commercial and passenger vehicles, are able to deliver up to 10 kW of power but only into extremely low resistance loads, such as 0.01 ohms. A conductive film windshield heater, to be sufficiently transparent, must have a resistance of over 1 ohm. Thus, traditional 12V power sources are unable to meet the requirements of a rapid windshield deicing system with a transparent windshield heater.

Previous attempts to increase on-board voltage have involved either disconnecting an alternator from a battery and increasing idle rotation speed (see, for instance, U.S. Pat. No. 4,862,055) or feeding a step-up transformer with non-rectified AC current from an alternator (see, for instance, U.S. Pat. No. 5,057,763). In both cases, output power was limited by the size of the alternator such that the voltage necessary for rapid windshield deicing could not be achieved without significant resizing of the alternator. Moreover, since an alternator generates low-frequency power, a step-up transformer of sufficient output power would be heavy and costly to manufacture. An unregulated alternator has been used to directly supply electrical heating power in U.S. Pat. No. 3,572,560.

SUMMARY

Cost efficient, lightweight and rapid windshield deicing systems and methods are disclosed. The systems utilize step-up converters or inverters, or dual-voltage batteries, to provide a voltage high enough to deice a windshield in less than thirty seconds. Some of the disclosed systems include sensors for deicing element and ambient temperatures, and in some embodiments windspeed. All embodiments have a controller for limiting deicing time to that sufficient to melt a boundary layer of ice and prevent the boundary layer from refreezing while the ice is removed from the windshield. The controller of embodiments with sensors computes deicing time as a function of ambient temperature. Embodiments interact with wiper systems to enable wipers to clear ice once the boundary layer is melted.

In one embodiment, a windshield deicing system includes a low voltage power source for providing low voltage power; a step-up subsystem comprising a converter selected from the group consisting of a DC-DC converter, a DC-AC inverter, and a dual-voltage battery, the step-up subsystem configured to transform the low voltage power into high voltage power, wherein if the step-up converter is a DC-DC converter or a DC-AC inverter, the step-up converter is an intermittent-duty converter. The deicing system also includes a controller-timer for enabling the step-up converter for a deicing time determined sufficient to melt a boundary layer of ice, where the boundary layer of ice is between one micron and one millimeter in thickness; and a windshield heater, the windshield heater being resistively heated at a deicing power level when the converter is enabled and the high voltage power is conducted through the windshield heater.

In an embodiment, a method of deicing a windshield, has steps including providing a source of low voltage power; transforming the low voltage power into high voltage power; measuring an ambient temperature; determining a deicing time sufficient to melt a boundary layer of ice from at least the ambient temperature; and providing the high voltage power to a windshield heater for the deicing time to resistively heat the windshield heater and deice a surface of the windshield.

In one embodiment, a windshield deicing system includes: a dual-voltage battery for providing low voltage DC power in a low voltage mode and high voltage DC power in a high voltage mode; a first switch disposed between the dual-voltage battery and additional electrical components of a vehicle, the first switch being closed when the dual-voltage battery is in the low voltage mode; and a second switch disposed between the dual-voltage battery and a windshield heater, the second switch being closed and the first switch being open when the dual-voltage battery is in the high voltage mode. An alternative embodiment of dual-voltage battery has multiple low voltage, such as 12-volt, sections. These sections are coupled in parallel for high-current low voltage applications such as vehicle starting. When high-voltage is required, the sections of the battery are coupled in series, but one section remains coupled to low voltage loads to buffer alternator surges and power low current loads such as electronic engine controls.

In one embodiment, a method of deicing a windshield, includes providing low voltage power to electrical components of a vehicle, transforming the low voltage power into high voltage power and providing the high voltage power to a windshield heater to resistively heat the windshield heater and deice a surface of the windshield.

DETAILED DESCRIPTION OF THE DRAWINGS

As used herein the terms deicing and defrosting shall be used interchangeably to refer to a process that removes frozen water from a surface. The frozen water may be of any form. For example, the frozen water may be present as a solid layer of ice or as ice crystals adhered to the surface.

The windshield deicing systems disclosed herein provide a high density of heating power (W/m$^2$), which allows for rapid and energy-efficient deicing. Rapid heating insures that only a thin, or boundary, layer of ice (e.g., between 1 μm and 1 mm) at the ice/windshield interface is heated to the ice melting point.

Where large forces are available to slide released ice off of a surface, it has been found that melting a boundary layer of thickness on the order of surface roughness is sufficient to deice an object, in some cases this may be as low as one micron in thickness. With less substantial forces available to strip released ice from a surface, and need to keep the boundary layer from refreezing while gravity or wipers remove ice from windshields, the boundary layer melted by the devices herein described is typically of minimum thickness between one and two hundred microns, although some embodiments may melt up a boundary layer of up to one millimeter thickness.

Heat penetrates ice, glass, and butyl anti-shatter plastic layers slowly. With rapid heating there is little time available for heat to diffuse from the heater and melted boundary layer into ice and windshield. Therefore, with rapid heating, remote parts of the windshield, such as the interior surface of the windshield, and of the ice are not unnecessarily heated, and minimal energy is lost to the surrounding environment. This concept is further described in U.S. Pat. Nos. 6,870,139 and 7,034,257, which are each incorporated herein by reference. As shown in these patents, the higher the density of heating, the less energy is needed to accomplish deicing.

Figure 1:
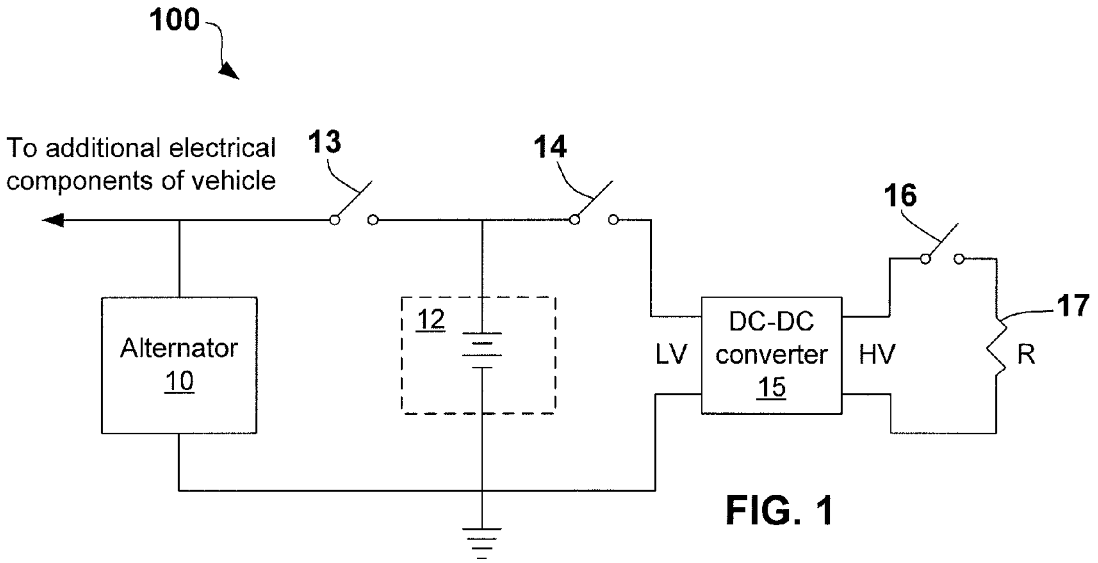
FIG. 1 illustrates one exemplary windshield deicing system embodiment having a step-up DC-DC converter.

FIG. 1 shows a windshield deicing system 100 including an alternator 10, a battery 12, a step-up DC-DC converter 15, a windshield heater 17, and switches 13, 14 and 16. In normal vehicle operation, switch 13 is closed and switches 14 and 16 are open. During deicing, switch 13 may be either open or closed and switches 14 and 16 are closed. In the deicing configuration, the step-up DC-DC converter 15 converts low voltage direct current (DC) power (for instance, 12V DC) from battery 12, or from battery 12 and alternator 10, into high voltage DC power (typically from 70V to 300V, or from 40V to 1000V). The high voltage is used to power windshield heater 17, which generates heat due to electrical resistance, R.

Alternator 10 is one form of charging system that may be provided in a vehicle for battery 12, it is anticipated that other charging systems, such as an engine-driven DC generator, may be adapted for use with system 100.

In an alternative embodiment, switch 14 is replaced with a high-current fuse. In embodiments having switch 14, closure of switch 14 activates the DC-DC converter. In embodiments lacking switch 14, a control input is provided to the DC-DC converter 15 is provided. The control input to the DC-DC converter in one state enables the DC-DC converter, and in another state disables internal switching transistors of an input DC-AC section of the DC-DC converter, thereby preventing the DC-DC converter from drawing power from the battery.

One advantage of system 100 is that battery 12 alone, or together with alternator 10, can supply heater 17 with more power than alternator 10 alone. A typical 12V battery, as fitted in a car for example, is capable of supplying from 7 kW to 10 kW for up to about thirty seconds without being damaged. Thirty seconds of 7 kW power is sufficient to deice a windshield, and battery 12 may be recharged by alternator 10 between such deicing events.

Another advantage of system 100 is that, due to the use of high voltage and high power, the duration of deicing is short (e.g., less than thirty seconds at T≥10° C.), compared to most prior-art deicing systems. Step-up DC-DC converter 15 may thus be of smaller size and lower cost than similar converters designed for continuous operation at the same power level. For example, the transformer and its windings within step-up DC-DC converter 15 may be of smaller size, lower-grade magnetic materials may be used, and larger losses may be allowed in semiconductor devices, such as MOSFET switches and diodes, used to rectify the high voltage current of the step-up DC-DC converter. Similarly, smaller heat-sinks and fewer and smaller cooling devices, such as cooling fans, may be used on the semiconductor devices than would be required for continuous operation. For purposes of this document, DC-DC converters and DC-AC inverters having such smaller heat-sinks and/or fewer and smaller cooling devices and/or smaller size transformer and windings are referred to as intermittent-duty converters. Intermittent duty converters generally are capable of providing full deicing power for a short time, such as less than thirty seconds, but are not capable of providing full deicing power continuously. In some embodiments, an intermittent-duty converter can provide continuous power at a power level substantially below that of full deicing power levels, or can provide a sequence of very brief pulses at full deicing power where each pulse is separated by a cooling-off interval from each other pulse of the sequence.

A further advantage of deicing system 100 is that battery 12 and DC-DC converter 15 may be electrically separated from alternator 10 and other electric components of the vehicle by opening switch 13. Opening switch 13 may thus prevent damage to the vehicle's electronics when power is drawn from battery 12 and from high frequency harmonics that may be generated by DC-DC converter 15.

Figure 2:
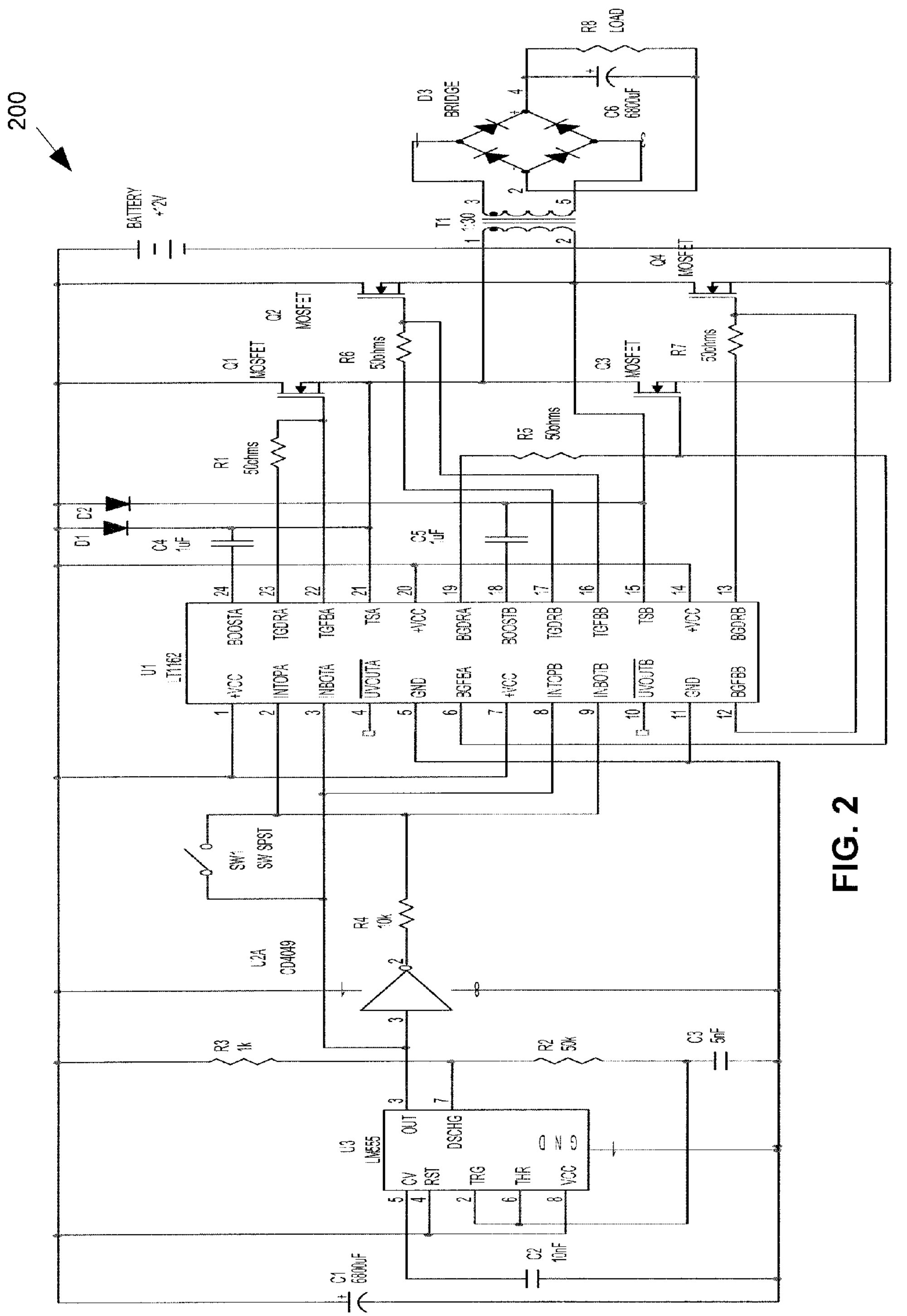
FIG. 2 illustrates an exemplary circuit of the step-up DC-DC converter of FIG. 1.

For illustrative purposes, FIG. 2 shows one exemplary circuit 200 of step-up DC-DC converter 15 of FIG. 1. Circuit 200 is a full-bridge DC-DC converter, but other types of step-up DC-DC converters, such as a half-bridge DC-DC converter, may be used in system 100.

It will be appreciated that switches 13, 14, and 16 may be mechanical, electromagnetic, solid-state semiconductor switches or a combination thereof. Further, switches 13, 14, and 16 may be replaced by short circuits without departing from the scope hereof. Without switches 14 or 16, other methods must be used for activating or deactivating the DC-DC converter, such as an electronic control signal to the control circuitry of the DC-DC converter to activate the heating pulse.

In an embodiment, DC-DC converter 15, or DC-AC inverter 35 (FIG. 3) operates at full power for initial defrosting of the windshield. Once the windshield is defrosted, the DC-DC converter 15, or DC-AC inverter 35 operates in a reduced-power-output mode to maintain the windshield in a defrosted condition. This reduced-power-output mode is either operation at a reduced voltage output, or a pulsed operation. For example, a windshield heater that absorbs 1 kilowatt at 500 volts will absorb only 250 watts at 250 volts; similarly the same windshield heater that is operated by a converter that provides 1 kilowatt for only one quarter of each second will absorb an average power of only 250 watts.

Figure 3:
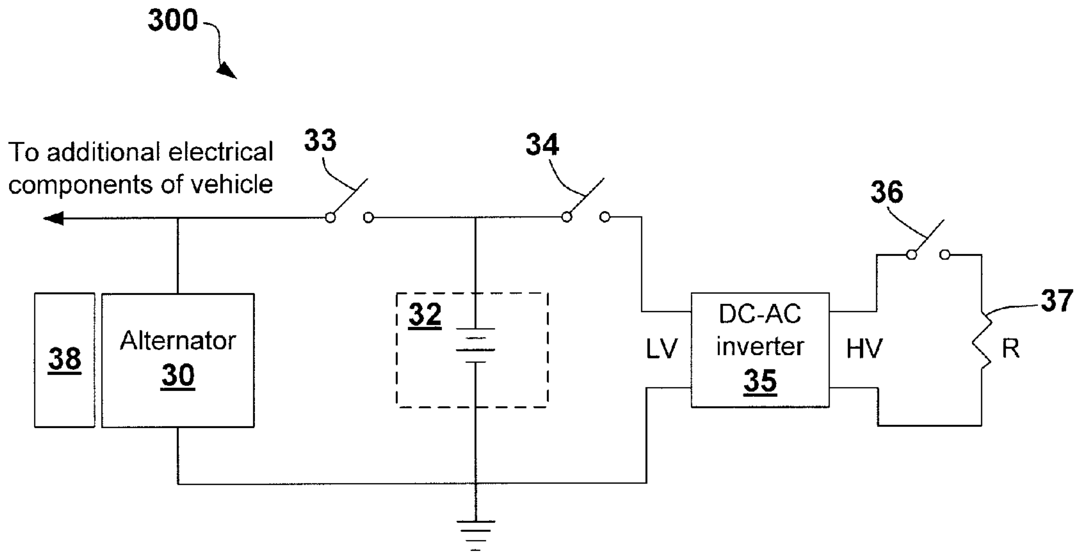
FIG. 3 illustrates one exemplary windshield deicing system embodiment having a step-up DC-AC inverter.

FIG. 3 shows one exemplary windshield deicing system 300 including an alternator 30, a battery 32, a step-up DC-AC inverter 35, a windshield heater 37, and switches 33, 34 and 36. During normal vehicle operation, battery-alternator switch 33 is closed and switches 34 and 36 are open. During deicing, switch 33 may be either open or closed and switches 34 and 36 are closed. For the deicing operation, step-up DC-AC inverter 35 inverts low voltage DC power (for instance, 12V) taken from battery 32, or from battery 32 and alternator 30, into high voltage AC power (typically from 70V to 300V, or from 40V to 1000V) to power windshield heater 37, which produces heat due to electrical resistance, R. A typical range of AC frequencies for system 300 is from about 50 Hz to about 150 kHz. In an embodiment, DC-AC inverter 35 is an intermittent-duty converter as described above.

As previously stated with reference to the DC-DC converter 15, other circuitry for enabling the DC-AC inverter 35 may be used in place of switch 34.

One advantage of system 300 is that battery 32 alone, or together with alternator 30, can supply windshield heater 37 with more power than alternator 30 alone. A regular 12V battery is capable of supplying from 7 kW to 10 kW for up to about thirty seconds without being damaged. Thirty seconds is sufficient to deice a windshield, and battery 32 may be recharged by alternator 30 between deicing events.

Another advantage of system 300 is that, due to the use of high voltage the duration of deicing is short (e.g., less than thirty seconds at T≥10° C.). Step-up DC-AC inverter 35 may thus be of smaller size and lower cost than similar inverters designed for continuous operation at the same power level. For example, the transformer and its windings within DC-AC inverter 35 may be of smaller size, lower-grade magnetic materials may be used for its step-up transformer, and larger losses may be allowed in semiconductor devices, such as MOSFET switches and diodes, used to rectify the high-voltage current of the DC-AC inverter.

Further, since de-icing typically takes place with a cold engine idling, fast de-icing times will help conserve fuel and minimize pollutant gas emissions from the vehicle.

Yet another advantage of deicing system 300 is that battery 32 and DC-AC inverter 35 may be electrically separated from alternator 30 and other electric components of the vehicle when switch 33 is open. Opening switch 33 may prevent damage to the vehicle's electronics when high power is drawn from battery 32, and from high frequency harmonics that may be generated by DC-AC inverter 35, especially if load-dump surge-suppression circuitry or an auxiliary battery 38 is provided. Since abrupt disconnection of even a 12-volt battery from an alternator charging the battery at high current can cause surges exceeding 100 volts, surge suppression circuitry or auxiliary battery 38 is recommended.

It will be appreciated that DC-DC converter 15 (FIG. 2) may be an example of a step-up DC-AC inverter 35 after removal of the bridge-rectifier connected between the secondary winding of the step-up transformer and windshield heater 17, 37.

It will further be appreciated that switches 33, 34, and 36 may be mechanical, electromagnetic, solid-state semiconductor switches or a combination thereof. Further, switch 34 may be replaced by a short circuit without departing from the scope hereof provided alternative apparatus for enabling the system is provided, and switches 33 and 36 may be replaced by short circuits in some embodiments.

Figure 3A:
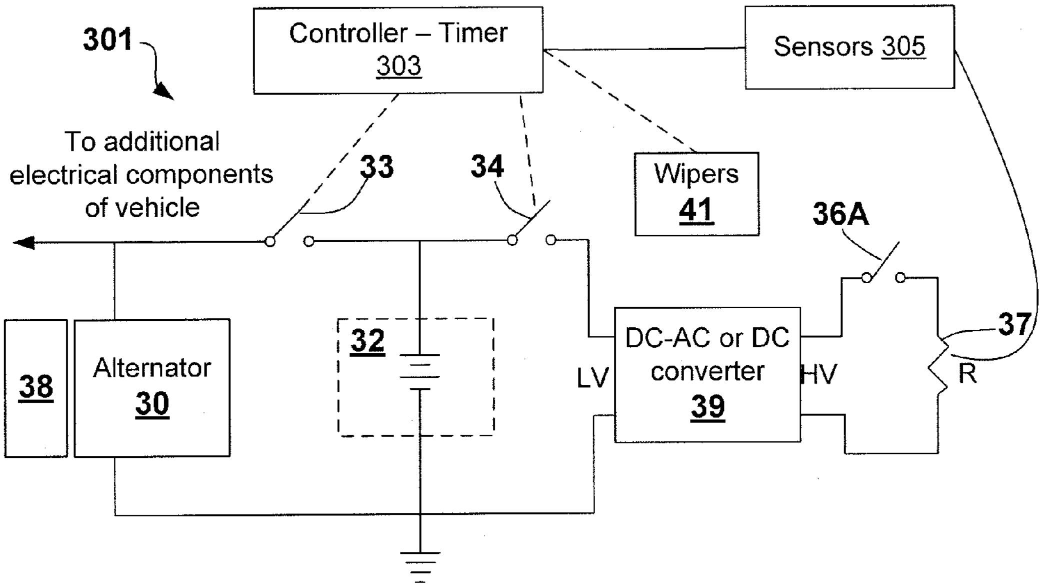
FIG. 3A illustrates another windshield deicing system having a step-up DC-AC or DC-DC converter.

In an alternative embodiment 301, as illustrated in FIG. 3A, some elements resemble those having the same reference number in FIG. 3 and, in the interest of brevity, are not re-described here. A controller-timer 303 is provided to control deicing and anti-icing operations; the controller-timer is activated either manually, or in an embodiment automatically upon vehicle startup in weather conditions expected to permit ice accumulation on the windshield.

When deicing is desired, controller-timer 303 opens battery-alternator switch 33 and closes battery-inverter switch 34, or otherwise enables operation of DC-DC converter or DC-AC inverter 39 to provide high voltage power to windshield heater 37. In some embodiments, the high voltage power is provided to one or more zones of the windshield heater 37 through one more high voltage switches 36A, in other embodiments converter or inverter 39 is directly coupled to windshield heater 37.

Figure 3B:
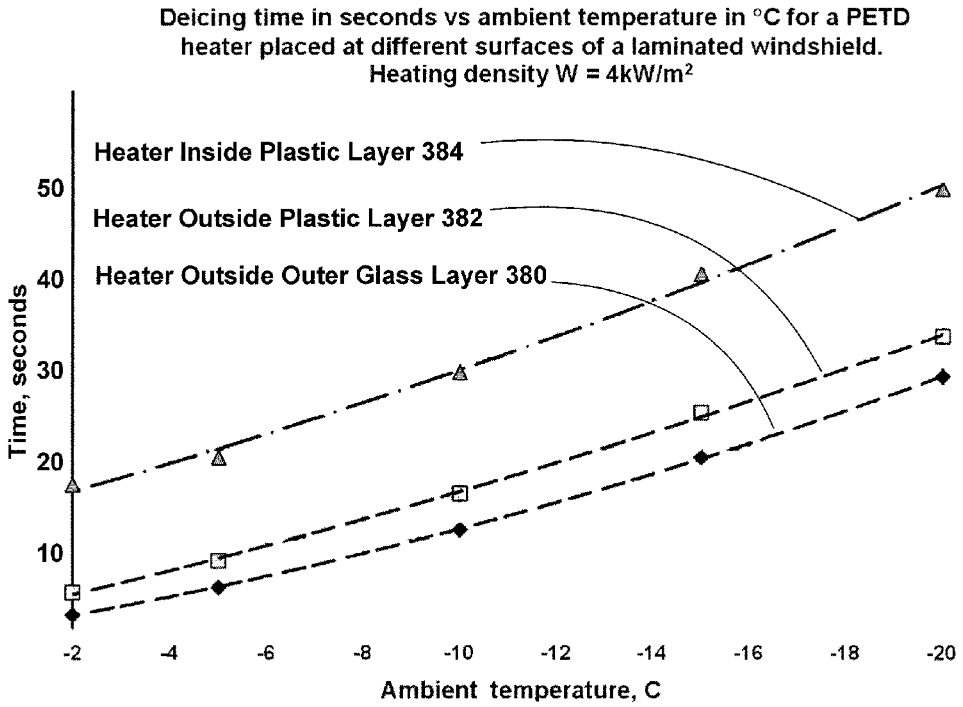
FIG. 3B illustrates dependence of deicing time on ambient temperature.
Figure 3C:
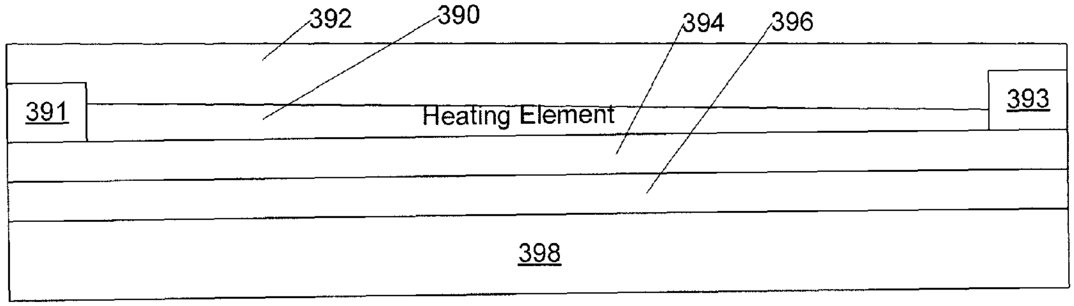
FIG. 3C illustrates a cross section showing a heating element and dielectric coating of exaggerated thickness on a 3-layer laminated windshield.

Experiments and computer simulations have found that time required to heat ice adherent to a windshield sufficiently to melt a boundary layer of ice of between one micron and two tenths millimeter thickness varies with temperature as illustrated in FIG. 3B. FIG. 3B represents deicing times determined from a simulator at 4 kW per square meter power density. At this power density, it is possible to melt a boundary layer of ice in less than thirty seconds at ambient temperatures of minus 10 C or greater, using a windshield heater either outside or inside the outer layer of glass, and outside the plastic anti-shatter layer, of a laminated windshield. A windshield (FIG. 3C) having a deicing heater is illustrated in schematic manner, with thickness of the deicing heater element 390 and dielectric coating 392 greatly exaggerated relative to thickness of outer 394 and inner 398 glass layers and a butyl plastic anti-shatter layer 396. The heater element 390 is illustrated as on the outer surface of the outer glass layer 394, with a thin dielectric coating, so time required to melt a boundary layer plotted versus temperature for a windshield with the heater in this location is plotted on line 380. In an alternative embodiment, the heater may be between the outer glass layer 394 and butyl plastic layer 396, time required to melt a boundary layer with the heater in this location is plotted on line 382. In yet another alternative embodiment, the heater is between the inner glass layer 398 and the butyl plastic layer 396, time required to melt a boundary layer with the heater in this location is plotted on line 384.

Windshields are often not square, curved windshields having a nearly bent-trapezoidal shape are common. In an embodiment, a thickness of the windshield heating element 390 varies to produce as nearly as possible an equal power density throughout the area of windshield covered by the heater. In such an embodiment, the heater is thinner, having higher resistance per unit area but with reduced current density, near a busbar 393 located near a wide side of a trapezoidal windshield, and thick, having lower resistance but greater current density, near a busbar 391 located near a narrow side of the nearly bent-trapezoidal windshield. In such an embodiment, thickness of the heating element tapers from its thick to its thin side. A method of determining thickness of the heating element to provide nearly even heating across a curved, non-square, surface is described in WO 2008/060696, entitled "Pulse Electrothermal Deicing Of Complex Shapes," the disclosure of which is incorporated herein by reference.

Controller-timer 303 is equipped with sensors 305, in an embodiment sensors 305 include at least a temperature sensor adapted for measuring outside air ambient temperature. In an embodiment, controller-timer 303 is adapted to determine an initial deicing pulse duration sufficient to melt a boundary layer of ice of between one micron and two tenths millimeter thickness based upon at least the outside air ambient temperature; in an embodiment the deicing pulse duration is determined by interpolation in a table.

Ice adherent to a windshield comes in various forms. Ice may be clear, solid, dense ice such as may form from freezing rain. Ice may also be less dense ice formed from adherent snow or frost. In an embodiment, sensors 305 include sensing apparatus adapted to determine a density of the ice adherent to the windshield. In an embodiment, such sensing apparatus operates by measuring dielectric properties of the ice at high frequency. In embodiments having sensing apparatus adapted to measuring ice density, controller-timer 303 is adapted to determine the initial deicing pulse duration based upon both outside air ambient temperature and ice density, in an alternative embodiment controller-timer 303 determines the initial pulse duration by interpolating into a table of at least two dimensions, with one dimension being ambient air temperature and another being ice density.

It is also known that the time required to melt a boundary layer of ice may depend on air velocity outside the windshield. While it is expected that windshields of most vehicles are deiced prior to movement because of the severe effect that ice often has on vision through the windshield, ice requiring removal may accumulate during vehicle operation. Such ice may accumulate, for example, while an aircraft flies, or a truck drives, through freezing rain. In an embodiment, sensors 305 include sensors adapted to measuring or estimating an air velocity. In an aircraft embodiment, sensors 305 may include an airspeed sensor such as a pitot tube or a laser Doppler airspeed sensor. In an alternative vehicular embodiment, sensors 305 and controller-timer 303 determine an estimated airspeed by adding a measured vehicle speed to a constant to allow for some wind. In an embodiment, controller-timer 303 is adapted to determine the initial deicing pulse duration sufficient to melt a boundary layer of ice of between one micron and two tenths millimeter thickness based upon at least the outside air ambient temperature, ice density, and air velocity; in an embodiment the initial deicing pulse duration is determined by interpolation in a table of at least three dimensions.

In some embodiments, the initial deicing pulse duration is used as the final deicing pulse duration of a deicing pulse, in some alternative embodiments the initial deicing pulse duration is refined into a final deicing pulse duration either prior to, or during, deicing. For example, it is known that lead-acid automobile batteries provide high power with a voltage that depends on battery condition, temperature, and state of charge. Further, some DC-DC, DC-AC, and dual-voltage battery circuits may provide voltage, and hence power, to a windshield that varies with battery voltage. For these reasons, in a particular alternative embodiment sensors 305 include a voltage sensor for monitoring either battery voltage or heater voltage, and the controller-timer 303 adjusts or refines the initial deicing pulse duration into a final deicing pulse duration by performing calculations that include compensation for actual battery voltage—providing longer final deicing pulse durations at low battery voltage than at high battery voltage.

The heating element 390 has resistance that depends on many factors, including the material from which it is made, its thickness, and its instantaneous operating temperature. In an embodiment, sensors 305 incorporate apparatus for measuring resistance of all, or a portion of, heating element 390 while power is applied to heating element 390, and thereby determine a real time temperature of the heating element 390. In alternative embodiments, other apparatus is provided for measuring a real-time temperature of the heating element and/or windshield-ice interface, in one alternative embodiment temperature of the windshield-ice interface is determined by comparing infrared light intensity at at least two wavelengths. It is also expected that temperature of the heating element plotted against time will vary with factors including at least ambient outside air temperature, ice density, outside air velocity, and can be related to the point in time that a boundary layer of ice is melted. In embodiments having sensors 305 for measuring real-time temperature of the heating element 390 or ice-windshield interface, controller-timer 303 is adapted to refine the initial deicing pulse duration into a final deicing pulse duration based at least in part on the measured real-time temperature.

Once the controller-timer 303 has determined that a boundary layer of ice adherent to the windshield has melted, controller-timer 303 activates windshield wipers 41 to displace the ice. In an embodiment, the controller-timer turns on the windshield wipers after the heating element 390 has been turned on for the initial deicing pulse duration, in an alternative embodiment controller-timer turns on the windshield wipers after the heating element 390 has been turned on for the final deicing pulse duration.

To keep the melted boundary layer from refreezing while wipers 41 are clearing ice from the windshield, in an embodiment heating element 390 is kept on for a short time after the wipers are enabled, the heating pulse thereby overlaps wiper action. After wipers 41 complete at least one sweep, controller-timer 305 turns off the windshield wipers 41. In an alternative embodiment, the final deicing pulse duration is lengthend to provide sufficient heat to the boundary layer of ice to prevent the boundary layer from refreezing while ice is cleared from the windshield, the deicing pulse is then turned off and the wipers are enabled without overlap.

Figure 4:
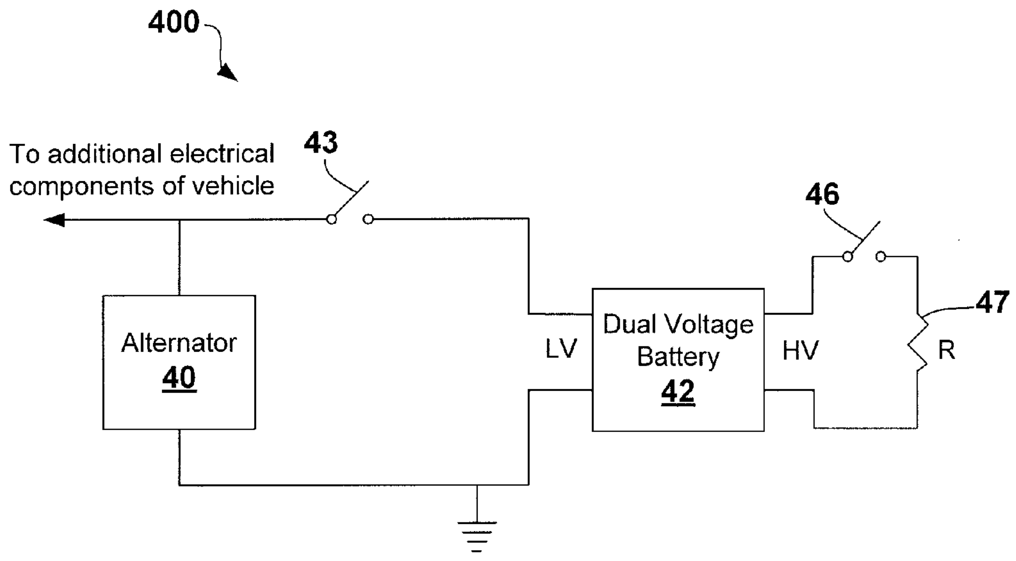
FIG. 4 illustrates one exemplary windshield deicing system embodiment having a dual-voltage battery.

FIG. 4 illustrates a windshield deicing system 400 having a dual-voltage battery 42 to be used as a high-power/high-voltage source for rapid windshield deicing. System 400 includes an alternator 40, dual-voltage battery 42, a windshield heater 47 and switches 43 and 46. During normal vehicle operation, battery 42 is set to a low voltage mode (for instance, 12V), switch 43 is closed and switch 46 is open. During deicing, switch 43 is open, battery 42 is set to a high-voltage mode (for instance, 70V to 300V, or from 40V to 1000V) and switch 46 is closed.

Figure 5:
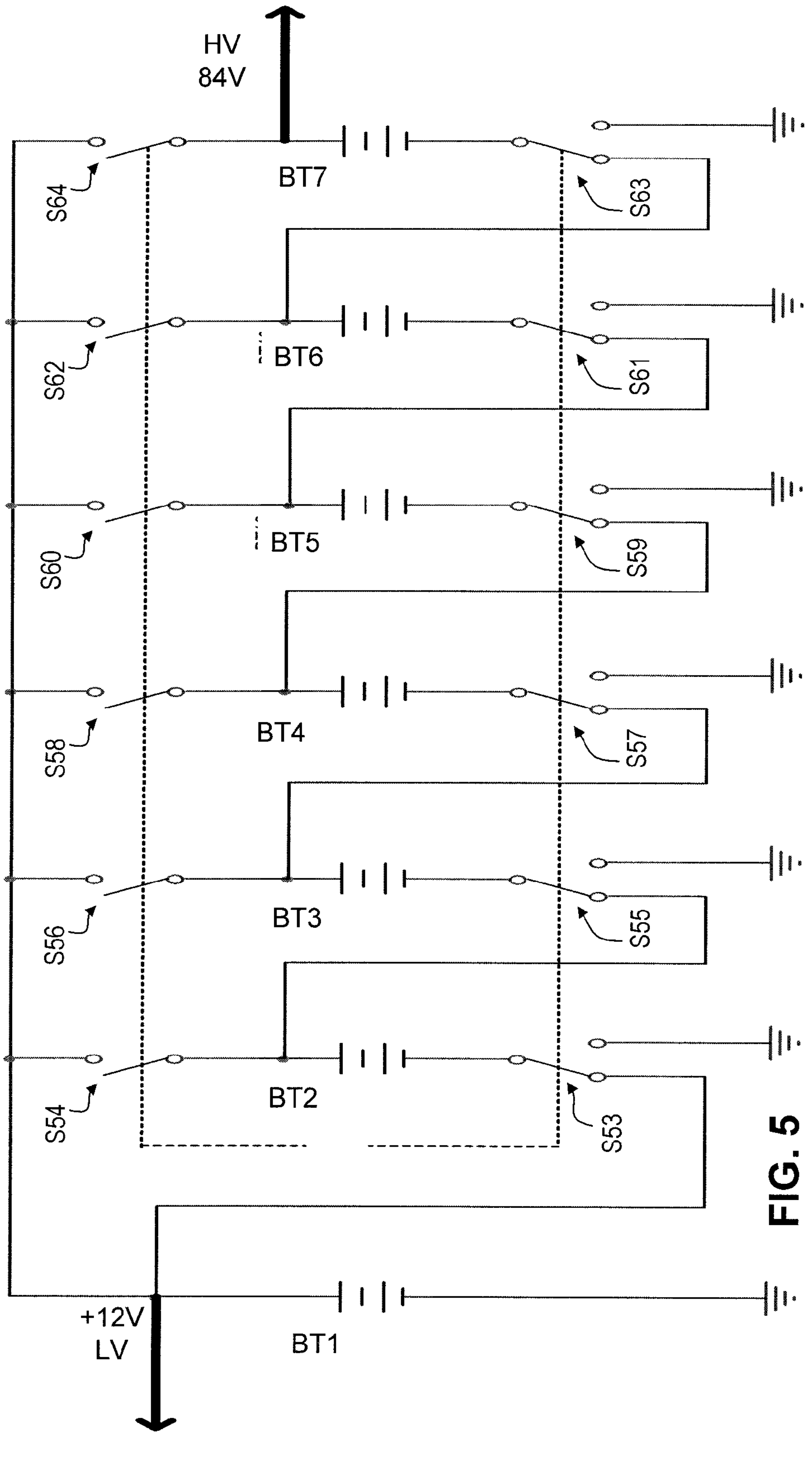
FIG. 5 illustrates exemplary circuitry of the dual-voltage battery of FIG. 4.

Dual-voltage batteries are disclosed, for example, in U.S. Pat. Nos. 3,667,025 and 4,114,082, which are incorporated herein by reference. Typically, a dual-voltage battery is formed of a bank of smaller, or sub-batteries BT1, BT2, BT3, BT4, BT5, BT6, and BT7. FIG. 5 illustrates exemplary principle circuitry of dual-voltage battery 42, which may, for example, provide 12V power in low voltage mode and 84V power in high voltage mode. It will be appreciated that other voltage limits may be achieved by providing different types or numbers of batteries in the bank. When the batteries BT1-BT7 are connected in parallel, dual-voltage battery 42 delivers the same voltage as each individual battery, e.g., 12V, and is capable of delivering high current. In high voltage mode, the batteries BT1-BT7 are connected in series, and dual-voltage battery 42 is capable of delivering high voltage that is approximately equal to the sum of the voltages of the individual batteries. Switching between high voltage and low voltage modes may be accomplished by simultaneously triggering switches S53-S64. Connections shown in FIG. 5 correspond to the high voltage mode.

Figure 4A:
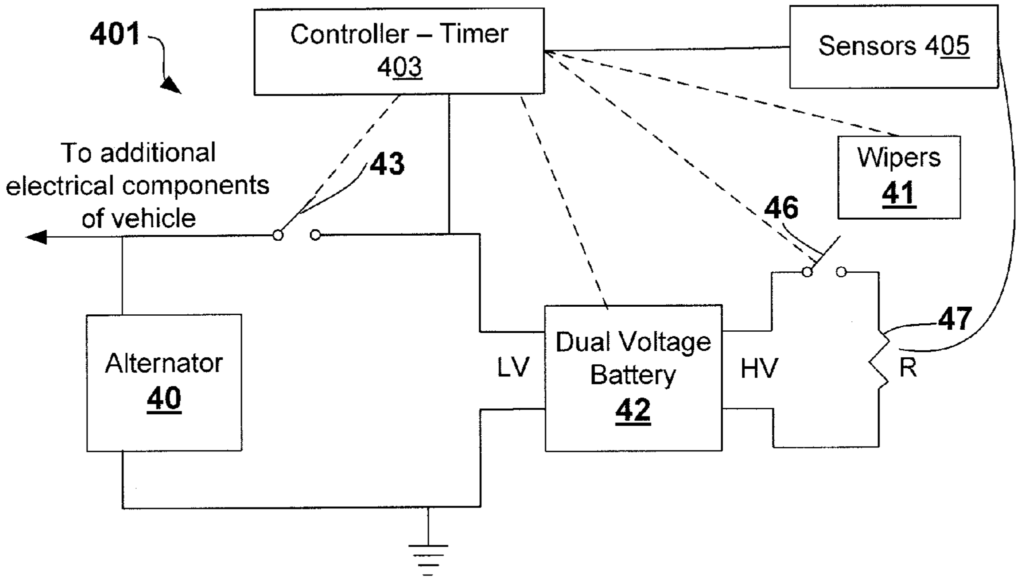
FIG. 4A illustrates another windshield deicing system embodiment having a dual-voltage battery, controller-timer, sensors, and an interface to a wiper system.

The dual-voltage battery illustrated in FIG. 5 has a low voltage terminal LV that can continue to supply a low voltage output at low current even when the dual-voltage battery is in high voltage mode, in an embodiment this output provides power for electronics such as the controller-timer 403 and sensors 405 of FIG. 4A. In low voltage mode, the LV terminal can provide high current such as is required for engine starting. In an alternative embodiment resembling that of FIG. 4A and having a dual-voltage battery configured as illustrated in FIG. 5, switch 43 remains closed during deicing so that sub-battery BT1 can continue buffering alternator surges while the battery is in high voltage mode and providing deicing power.

It will be further appreciated that the systems of FIGS. 1, 3, and 4 are capable of providing continuous lower-than-maximum heating power by switching periodically between an off state, the low-voltage configuration and the high-voltage configuration. Depending on a duty cycle, that average heating power can be adjusted to any desirable magnitude in between 0 W and a maximum power, which the high voltage configuration can provide. For instance, if the high-power configuration supplies 5 kW of peak power, when 10% duty cycle is used (for instance being for 0.1 s in the high-voltage mode and for 0.9 s in the low-voltage configuration over each one-second period) the system will apply 0.1*5 kW=500 W heating power to a windshield heater.

It should be further appreciated that when such intermittent mode is used for dual-voltage battery systems of FIGS. 4 and 4A, the battery contains finite energy and is therefore an intermittent-duty power source. Further, the dual-voltage battery is recharged from an alternator during vehicle operation when it is set to low-voltage mode between vehicle starts and deicing pulses. In an embodiment, the dual-voltage battery provides repeated, short, heating pulses to provide average heat at lower, maintenance, levels while being recharged between heating pulses.

One advantage of system 400 is that dual-voltage battery 42 is similar in size and weight to a regular low voltage battery, but it is capable of supplying windshield heater 47 with sufficient power to perform rapid windshield deicing.

Figure 6A:
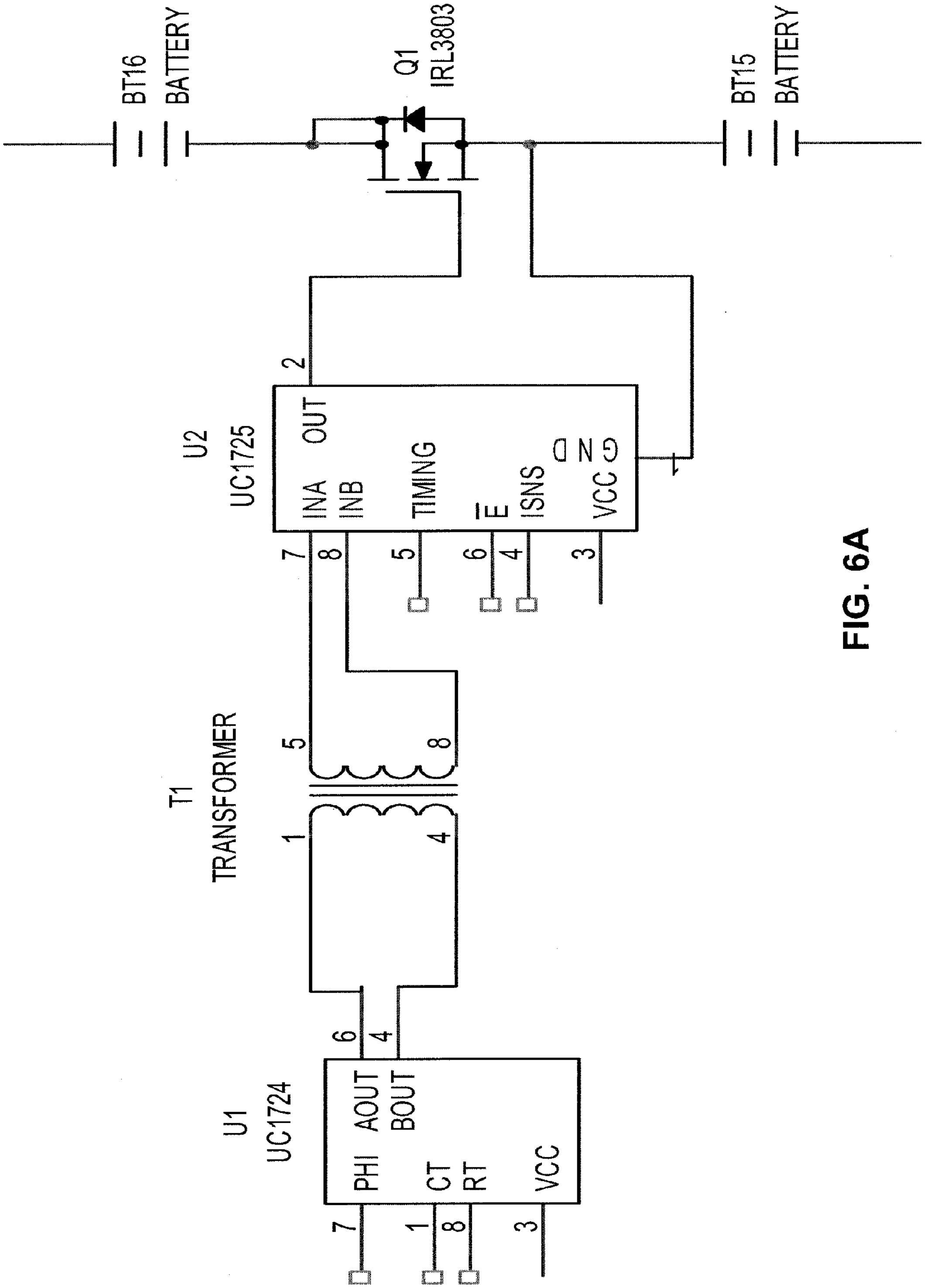
FIG. 6A shows one exemplary configuration of an inter-battery switch used in the dual-voltage battery of FIG. 4.
Figure 6B:
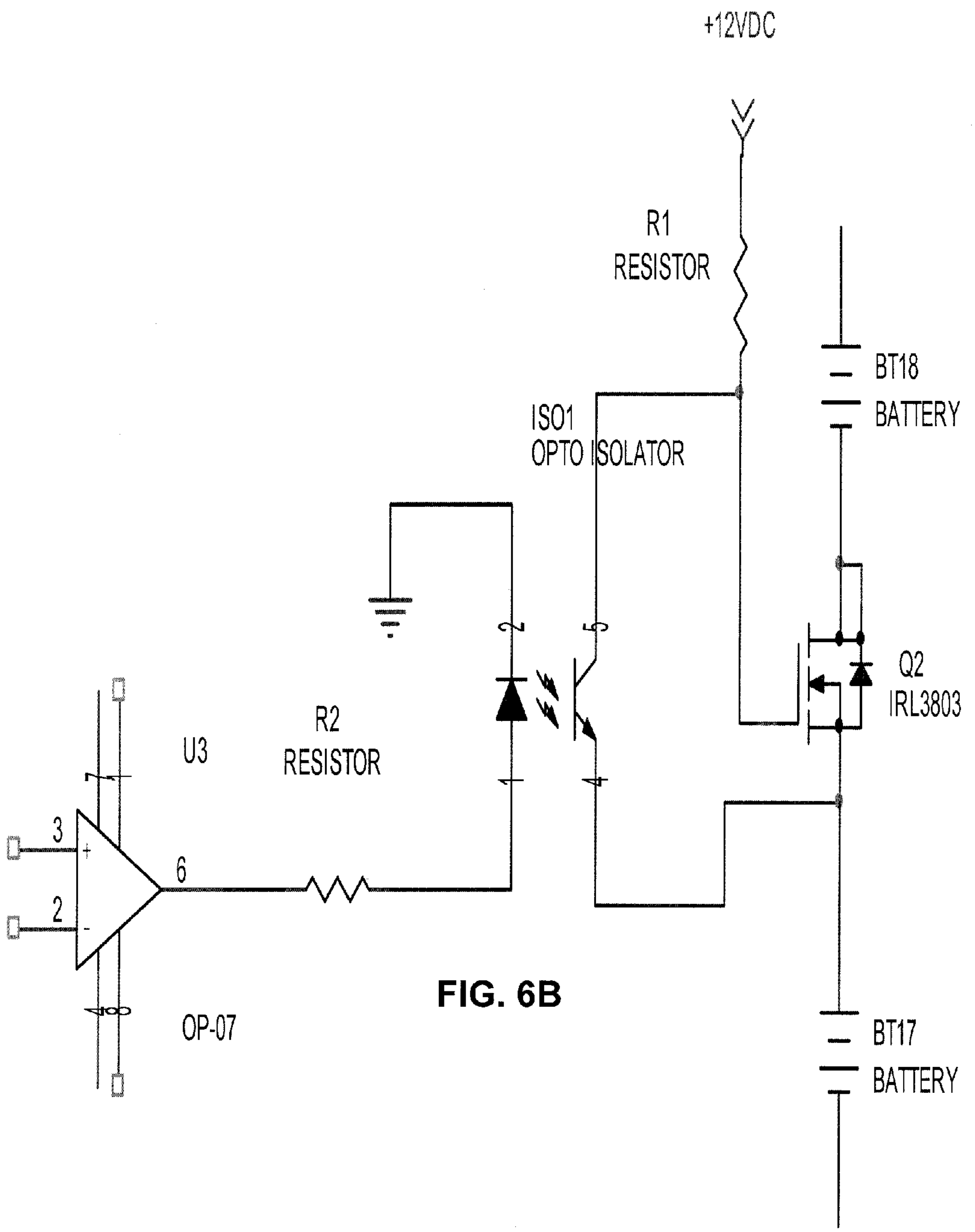
FIG. 6B shows another exemplary configuration of an inter-battery switch used in the dual-voltage battery of FIG. 4.

It will be appreciated that switches (43, 46 and 53-64) of FIGS. 4 and 5 may be mechanical, electromagnetic, solid-state semiconductor switches or a combination thereof. Two examples of possible battery switches are shown in FIGS. 6A and 6B. For example, the switch shown in FIG. 6A is based on an isolated high side FET driver, while the switch shown in FIG. 6B is based on an opto isolator driver.

Batteries 12, 32 and 42 of windshield deicing systems 100, 300 and 400 may be lead-acid batteries, Li-ion batteries, Ni-metal hydride batteries, or any other electrochemical type of battery known in the art.

In an alternative embodiment 401, as illustrated in FIG. 4A, some elements resemble those having the same reference number in FIG. 4 and, in the interest of brevity, are not re-described here.

A controller-timer 403 is provided to control deicing and anti-icing operations; the controller-timer is activated either manually, or in an embodiment automatically upon vehicle startup in weather conditions expected to permit ice accumulation on the windshield. The controller-timer 403 determines an initial deicing pulse duration, and in embodiments having apparatus for determining real-timer temperatures a final deicing pulse duration, in a manner similar to that previously described with reference to controller-timer 303 of FIG. 3A. Controller-timer 403 has sensors 405 similar to those previously discussed with reference to sensors 305.

In the embodiment of FIG. 4A, controller-timer 405, when activated, opens switch 43 to disconnect low voltage connections to dual voltage battery 42, then switches battery 42 to its high-voltage mode. It then closes switch 46 to turn on windshield heater 47, beginning a deicing pulse, and, after the boundary layer of ice has melted, enables wipers 41 to physically remove the ice.

In one embodiment, windshield heaters 17, 37 and 47 are continuous film metal-oxide transparent coatings made of indium-tin-oxide (ITO), zinc-oxide, tin-oxide or any other electrically conductive, transparent, film made of a single metal oxide or a composite of several metal oxides.

In another embodiment, windshield heaters 17, 37 and 47 are thin optically transparent metal films made of silver, aluminum, gold or the like, or of an electrically conductive and optically transparent polymer material.

Figure 7:
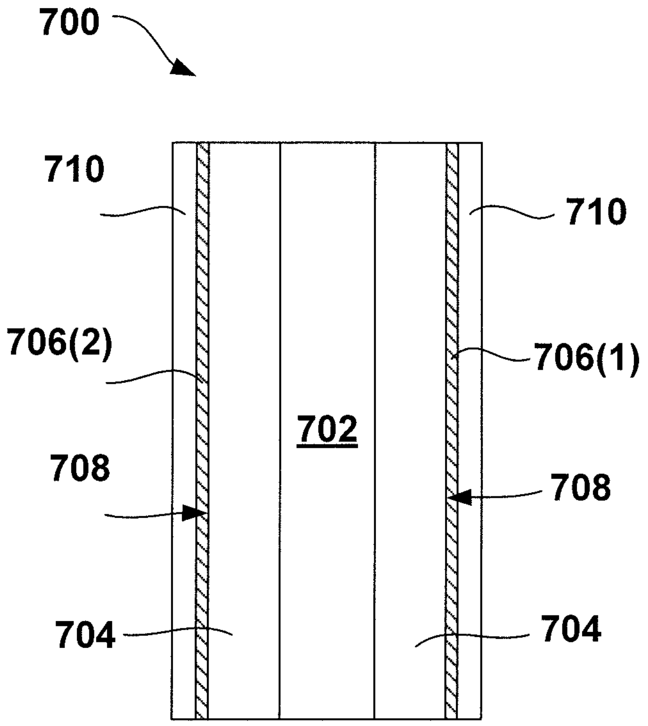
FIG. 7 shows a cross-sectional view of one exemplary windshield embodiment having windshield heaters disposed on outer surfaces of glass layers of the windshield.

FIG. 7 shows a cross-sectional view of a windshield 700. Windshield 700 comprises a polyvinyl butyral (PVB) shatter-resistant plastic layer 702 laminated between two layers of glass 704. Windshield heaters 706 are then disposed on outer surfaces 708 of glass layers 704, and dielectric layers 710 are disposed on windshield heaters 706. Dielectric layers 710 increase safety, as well as provide scratch protection for windshield heaters 706. Windshield heater 706(1) deices windshield 700, and windshield heater 706(2) defogs windshield 700.

Figure 8:
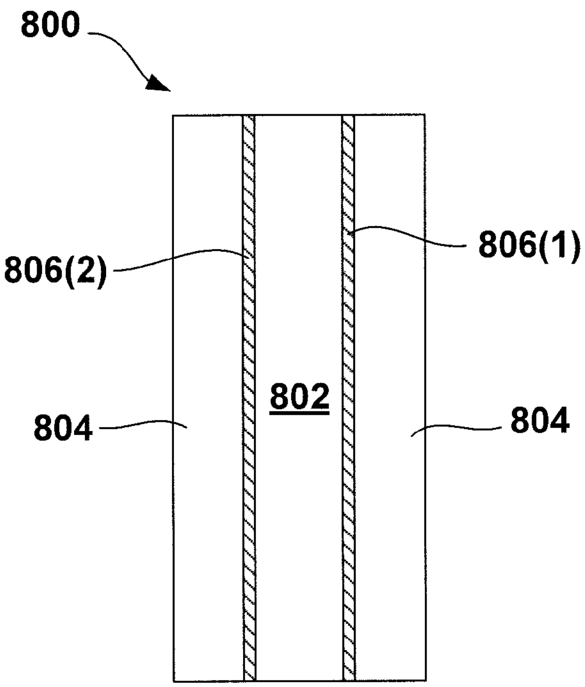
FIG. 8 shows a cross-sectional view of one exemplary windshield embodiment having windshield heaters disposed between a polyvinyl butyral (PVB) layer and glass layers of the windshield.

FIG. 8 shows a cross-sectional view of a windshield 800. Windshield 800 comprises windshield heaters 806 disposed between a polyvinyl butyral (PVB) shatter-resistant plastic layer 802 and glass layers 804. Windshield heater 806(1) deices windshield 800, and windshield heater 806(2) defogs windshield 800. It is appreciated that future windshields may be made of safety glass incorporating a shatter-resistant plastic layer of plastics other than PVB.

Figure 9:
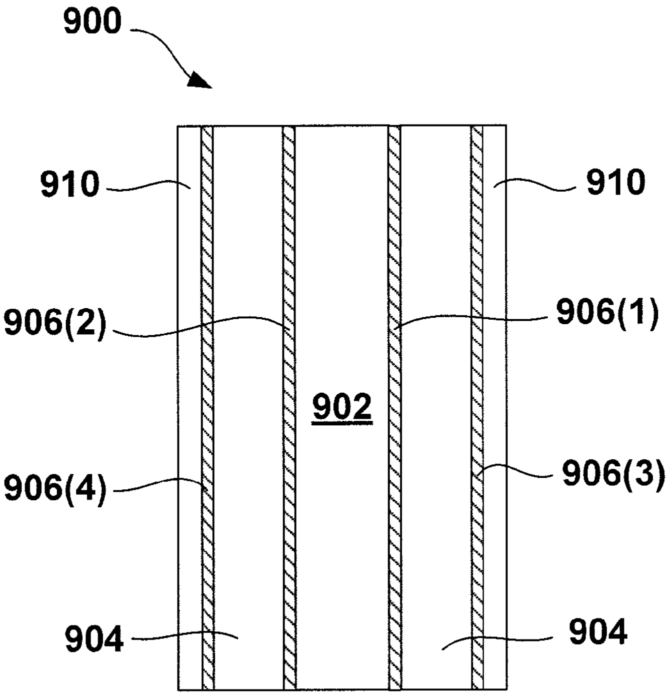
FIG. 9 shows a cross-sectional view of one exemplary windshield embodiment incorporating features from both FIG. 7 and FIG. 8.

FIG. 9 shows a cross-sectional view of a windshield 900 having features in common with both windshield 700 and windshield 800. Windshield 900 includes a polyvinyl butyral (PVB) layer 902, a first pair of windshield heaters 906(1) and 906(2), glass layers 904, a second pair of windshield heaters 906(3) and 906(4), and dielectric layers 910. Windshield heaters 906(2) and 906(4) may be electrically connected, and operate to defog windshield 900, while windshield heaters 906(1) and 906(3), which may be electrically connected, operate to deice/defrost windshield 900.

In one embodiment, the area of a windshield may be segregated into multiple sections, each section containing a windshield heater (such as windshield heaters 17, 37, 47, 706, 806, 906) that is electrically insulated from neighboring heaters/sections. Application of power to a windshield heater having a smaller area than the entire area of the windshield provides for application of the entire heating power to a relatively concentrated area. The entire area of the windshield may be deiced one section at a time.

Figure 10:
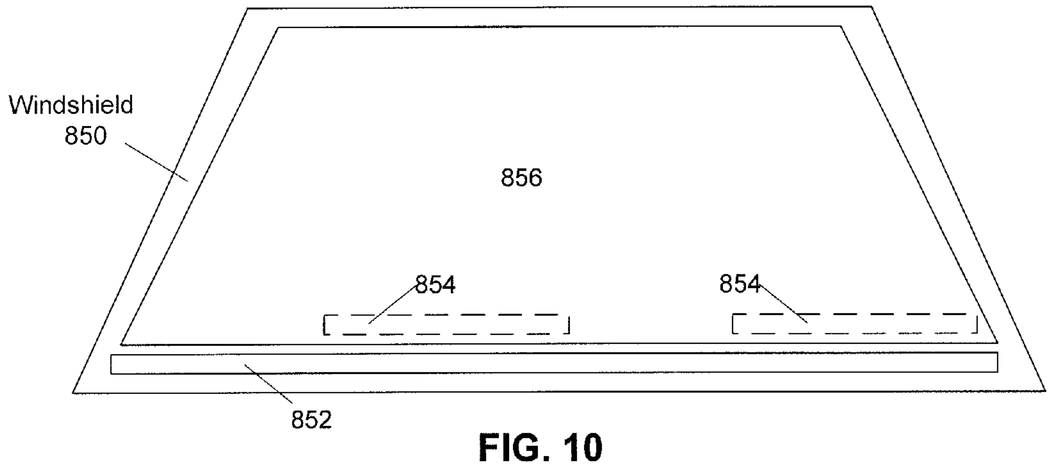
FIG. 10 illustrates a windshield layout such as may be used with the windshield deicing system herein described.

A typical windshield is not square, windshields are often complexly curved and heaters on such windshields have shape more trapezoidal than square. Further, wipers on such windshields are often paired, and typically follow curved paths. A non-square windshield 850 is illustrated in FIG. 10, with non-square main windshield heater 856 that covers almost all deiceable area of the windshield. The windshield 850 is equipped with paired windshield wipers (not shown) that normally rest in windshield rest areas 854 near a base of the windshield. The windshield of FIG. 10 may optionally be fitted with a second, separation-area, heating element 852 near, but not directly under, wiper rest area 854. In embodiments equipped with a separation area heater 852, the separation-area heater 852 is activated before the main windshield heater 856 to melt a strip of ice to separate ice adherent from ice adherent to other portions of the vehicle such that the wipers will be able to move and slide the ice on the windshield. While the separation-area heater is illustrated as a linear heater, the separation-area heater may have other shapes such as an inverted T-shape or a hollow-trapezoid shape as determined necessary for a particular vehicle.

Figure 11:
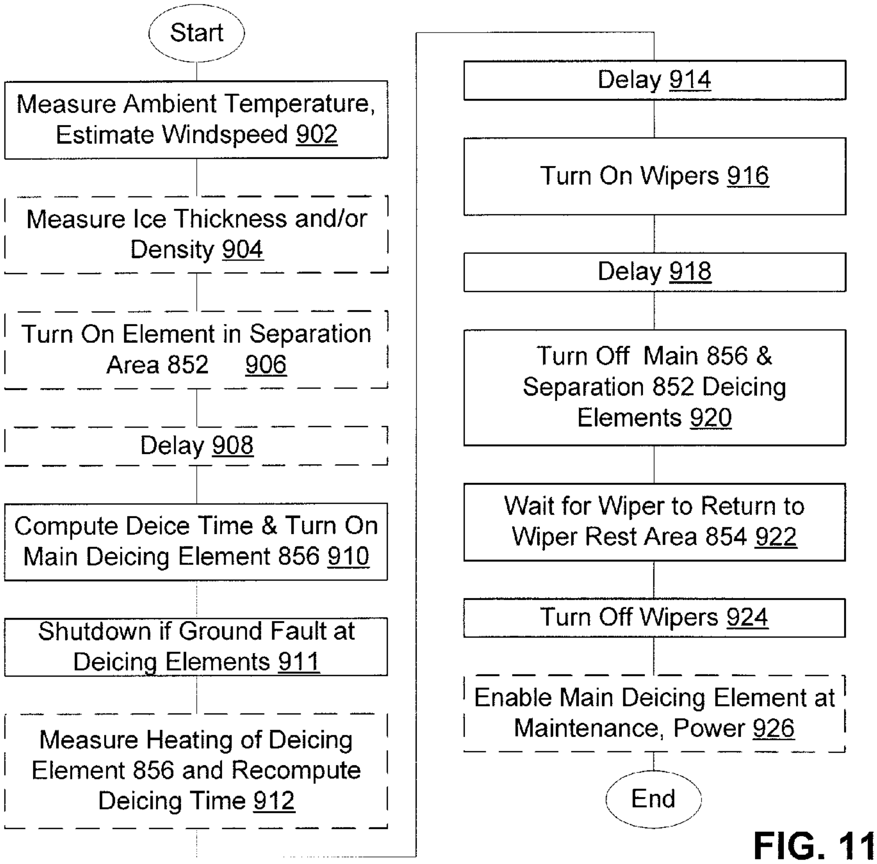
FIG. 11 is a flowchart of a method of deicing a windshield as herein described.

In an embodiment, the windshield deicing system operates as depicted in FIG. 11. Once activated, the controller-timer 303, 403 uses sensors 305, 405 to measure an ambient air temperature. In some particular embodiments, controller-timer 303, 403 also measures 904 ice density, windspeed, and in some variant embodiments ice thickness; the ambient air temperature, ice density, ice thickness, and any other measurements to compute an initial deicing time.

In embodiments equipped with a separation-area heater 852, the controller-timer turns on the DC-DC converter, DC-AC inverter, or switches a dual-voltage battery as heretofore described to activate the separation-area heater 852, and delays 908 for time sufficient to allow at least some ice over the separation-area heater 852 to melt to the point where the ice will fracture when windshield wipers are activated.

After delay 908, the controller-timer 303, 403 computes a deicing time based on at least the ambient air temperature, and in some embodiments based on ice density and estimated or measured air velocity, and turns on 910 the main heater 856. To ensure safe operation, main 856 and separation 852 heater elements are equipped with sensing circuitry to detect ground faults, if ground fault is detected, the entire windshield deicing system shuts down 911 with battery switches 33, 43 closed, high voltage switches 34, 46 open, and dual-voltage battery 42 in low voltage mode.

In some embodiments, heating of the deicing element 856 is measured 912 in real time, and deicing times are recomputed based on measured heating.

After waiting for the deicing time 914, the controller-timer 303, 403 turns on the windshield wipers, if the vehicle is equipped with windshield wipers, such that the wipers may separate the ice from ice adherent to other surfaces of the vehicle, and slide the ice off of the windshield.

After a short delay 918 such that the boundary layer of melted ice does not refreeze before the windshield wipers stop, the main 856 and separation 852 heaters are turned off 920 by the controller-timer. Once the wipers return to their rest positions 854, the controller-timer turns off the wipers unless further wiper operation is desired by a vehicle operator, driver, or pilot.

In some embodiments having DC-DC converters or DC-AC inverters, after ice has been removed from the windshield by a main heater 856 operating at a high, ice-clearing, power density of above two kilowatts per square meter, the system provides heat at a lower, maintenance, power density sufficient to keep the windshield clear of ice. In embodiments, the high, ice-clearing power density requires that the inverter or dc-dc converter provide deicing power at levels well above a maximum continuous-duty power rating of the intermittent-duty converter. Typically, the maintenance power level is less than or equal to one-fourth of the high, ice-clearing, power density, and is within a continuous-duty power rating of the converter. In such embodiments, once the main 856 and separation 852 heaters are turned off, the main heater 856 is re-enabled to provide windshield heating at the reduced, maintenance, power density. In a particular embodiment, the reduced, maintenance, power density is a power density computed by controller 303 based upon at least ambient air temperature and wind velocity. In an alternative embodiment, the reduced, maintenance, power density is determined at least in part by feedback from a sensor that measures windshield temperature.

Example

As discussed above, the main obstacle to rapid windshield deicing using conventional systems is insufficient on-board voltage. The following calculations further illustrate this point.

Typical windshield and ice parameters are shown in Table 1.

TABLE 1

| ITO coated solid-glass windshield | $R_2 = 10$ ohm (sheet resistance) |
|---|---|
| Windshield area | $A = 1.5\ m^2$ |
| Windshield aspect ratio | $r = 1.5$ |
| Ice thickness | $t_{ice} = 6$ mm |
| Effective windshield-glass thickness | $t_{glass} = 5$ mm |
| Ambient temperature | $T_{amb} = -10°$ C. |
| Ice melting point | $T_m = 0°$ C. |
| Glass density | $\rho_{glass} = 2500\ \frac{kg}{m^2}$ |
| Heat capacity of glass | $C_g = 750\ \frac{Joule}{kg \cdot ° C.}$ |
| Ice density | $\rho_{ice} = 920\ kg/m^3$ |

TABLE 1-continued

| ITO coated solid-glass windshield | $R_2$ = 10 ohm (sheet resistance) |
|---|---|
| Heat capacity of ice | $\rho_{ice} = 2200 \frac{J}{kg \cdot ° C.}$ |

For a windshield with electric bus-bars placed on the top and bottom of the windshield, the windshield electric resistance is:

$$R = R_{\square}/r = 6.67 \text{ ohm} \tag{1}$$

The heating density of the windshield, utilizing a 12V source, is:

$$W = \frac{P}{A} = \frac{V^2 \cdot r}{R \cdot A} = \frac{V^2 r}{R_{\square} A} = 14.4 \frac{W}{m^2}, \tag{2}$$

where P is the power. At such a low density of heating power, the windshield cannot be heated from −10° C. to 0° C., even in still air, because a cooling convective heat transfer rate of about $$h \approx 5 \frac{watt}{m^2 \cdot ° C.}$$

provides a cooling power rate of:

$$W_{conv} \approx h \cdot \Delta T \approx 50 \frac{watt}{m^2}, \tag{3}$$

where $\Delta T = T_m - T_{amb} = 10°$ C. Thus, the cooling power rate exceeds the heating power rate by a factor of about three.

Even when transparent conductive coatings having lower resistance than ITO are used, e.g., thin silver coatings with sheet resistivity $R_{\square}$=2 ohm, the time necessary to warm glass to the ice melting point is estimated as:

$$t = \frac{(C_g \cdot m_g + C_{ice} \cdot m_{ice})\Delta T}{P} \approx 3200 \text{ s}, \tag{4}$$

where the heating power for the silver coating is equal to P=108 W.

In reality, the deicing time t would be even longer than that calculated by eqn. (4) due to convective cooling and additional energy necessary to melt a layer of ice at the windshield/ice interface. When the thickness of the layer of ice melted is only 100 μm, the deicing time t increases by an additional 400 s. The total deicing time is thus 3600 s, or 60 minutes.

According to eqn. (4), rapid deicing (t≤30 s) would require an increase of the heating power by a factor of about 100. Thus, an increased voltage of about 100V would be needed for a silver-based transparent conductor, and about 200V to 300V for an ITO-based transparent conductor.

The deicing systems and methods disclosed herein are capable of providing voltage within the necessary range.

Since the DC-DC or DC-AC converter described herein for driving the transparent conductor is capable of producing electrical voltages at high current that could be hazardous to human health, it is anticipated that the converter either be potted with an insulating potting compound as known in the art, or have a safety interlock on its cover. Further, the connectors in wiring from the output terminal of the converter to the windshield should be of a type that does not leave exposed any uninsulated metal pins whether one or more of the connectors are in connected or disconnected condition. In embodiments with the resistive conductive film on the outer surface of the windshield, there should also be a thin insulating coating, or dielectric layer, over the transparent conductor layer on the windshield to prevent these voltages from contacting curious fingers.

In some embodiments having a DC-AC converter, a dual-voltage battery, or a DC-DC converter, wires of opposite polarity for attachment at opposite sides of the windshield are coupled to the windshield from the converter or battery through circuitry for detecting ground fault currents that may be lost through a resistive short circuit, such as a human, to vehicle ground; when such lost current is detected the high voltage power is immediately shut down or disconnected as to interrupt the ground fault. In other embodiments, the high-voltage output of the converter or battery is electrically isolated from the vehicle ground to reduce the possibility of a current through a human or other path to ground. In some of these isolated embodiments, an isolation monitor circuit is used to verify the integrity of the isolation and to immediately shut down or disconnect the high voltage if a fault is detected. In some embodiments, the converter or dual-voltage battery is also disabled or disconnected during vehicle conditions where human contact with the windshield is particularly likely, such as when a door is open or the engine is off.

Everything herein stated with reference to 12 volt systems, such as used in current production automobiles, is equally applicable to 24 volt systems as frequently used on trucks and recent production light aircraft, as well as to system using other battery voltages such as emerging 42 volt automotive systems.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

We claim:

1. A method of deicing a windshield, comprising:

providing a source of low voltage power;

transforming the low voltage power into high voltage power;

measuring an ambient temperature;

determining a deicing time for melting a boundary layer of ice from at least the ambient temperature; and providing the high voltage power at a first power level to a windshield heater for the deicing time to resistively heat the windshield heater and deice a surface of the windshield;

wherein determining a deicing time comprises measuring a density of ice and using the density of ice with the ambient temperature to determine the deicing time.

2. The method of claim 1 further comprising applying a maintenance-level heat at a second power level lower than the first power level.

* * * * *